United States Patent
Hioki

(10) Patent No.: US 11,709,157 B2
(45) Date of Patent: Jul. 25, 2023

(54) CHARGED-PARTICLE SUPPLY CONTROL METHOD AND DEVICE

(71) Applicant: SHIMADZU CORPORATION, Kyoto (JP)

(72) Inventor: Yusaku Hioki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/493,964

(22) PCT Filed: Mar. 16, 2017

(86) PCT No.: PCT/JP2017/010775
§ 371 (c)(1),
(2) Date: Sep. 13, 2019

(87) PCT Pub. No.: WO2018/167933
PCT Pub. Date: Sep. 20, 2018

(65) Prior Publication Data
US 2020/0124575 A1    Apr. 23, 2020

(51) Int. Cl.
*H01J 49/04*       (2006.01)
*G01N 30/72*       (2006.01)

(52) U.S. Cl.
CPC .......... *G01N 30/724* (2013.01); *H01J 49/045* (2013.01)

(58) Field of Classification Search
CPC ... G01N 30/724; G01N 30/7266; H01J 49/10; H01J 49/0445
See application file for complete search history.

(56) References Cited

U.S. PATENT DOCUMENTS

| 11,099,161 B2* | 8/2021 | Ueda ................. G01N 30/726 |
| 2005/0017164 A1* | 1/2005 | Mukaibatake ........ H01J 49/045 |
| | | 250/288 |

(Continued)

FOREIGN PATENT DOCUMENTS

| JP | 2001-183344 A | 7/2001 |
| JP | 2015-075348 A | 4/2015 |

(Continued)

OTHER PUBLICATIONS

Communication dated Feb. 21, 2020 from European Patent Office in EP Application No. 17900827.1.

(Continued)

*Primary Examiner* — Wyatt A Stoffa
(74) *Attorney, Agent, or Firm* — Sughrue Mion, PLLC

(57) ABSTRACT

Provided is a method for introducing into a probe 22 an eluate eluted from a component separation unit 14 that temporally separates components contained in a liquid sample, for obtaining charged particles, and for delivering the charged particles to a charged particle analysis unit 30 provided at a subsequent stage through a charged particle introduction opening 23, comprising steps of: supplying a gasification promoting gas for promoting gasification of the eluate and applying a predetermined charged-particle obtaining voltage to the probe 22 while the eluate is being introduced into the probe 22; and hindering the eluate nebulized by the probe 22 from moving toward the ion introduction opening 2 only in a time period other than a time period in which a target-component containing eluate is introduced into the probe 22.

5 Claims, 6 Drawing Sheets

(56) References Cited

U.S. PATENT DOCUMENTS

| | | | |
|---|---|---|---|
| 2007/0048187 A1 | 3/2007 | Sheehan | |
| 2014/0284473 A1 | 9/2014 | Ueda et al. | |
| 2014/0326871 A1* | 11/2014 | Whitehouse | H01J 49/26 250/288 |
| 2015/0144781 A1* | 5/2015 | Howes | H01J 49/045 250/288 |
| 2016/0163527 A1* | 6/2016 | Sekimoto | H01J 49/167 250/288 |
| 2017/0138831 A1 | 5/2017 | Okuda et al. | |
| 2019/0221415 A1* | 7/2019 | Covey | G01N 30/7233 |

FOREIGN PATENT DOCUMENTS

| | | |
|---|---|---|
| WO | 2013/057777 A1 | 4/2013 |
| WO | 2016/002647 A1 | 1/2016 |
| WO | 2016/178103 A1 | 11/2016 |
| WO | 2018/055483 A1 | 3/2018 |

OTHER PUBLICATIONS

Written Opinion of the International Searching Authority of PCT/JP2017/010775 dated May 23, 2017.
International Search Report of PCT/JP2017/010775 dated May 23, 2017.
Office Action dated Jun. 9, 2022 issued by the Chinese Patent Office in Chinese Application No. 201780088483.7.

* cited by examiner

CHARGED-PARTICLE SUPPLY CONTROL METHOD AND DEVICE

CROSS REFERENCE TO RELATED APPLICATIONS

This application is a National Stage of International Application No. PCT/JP2017/010775 filed Mar. 16, 2017.

TECHNICAL FIELD

The present invention relates to a charged-particle supply control method and a charged-particle supply control device for creating charged particles from an eluate from a component separation unit that temporally separates components contained in a liquid sample, and delivering the charged particles to a charged particle analysis unit provided at a subsequent stage.

BACKGROUND ART

A liquid chromatograph mass spectrometer including, in combination, a liquid chromatograph unit and a mass spectrometry unit is one of apparatuses for performing qualitative and quantitative analysis of a target component contained in a liquid sample. In the liquid chromatograph unit, a liquid sample is carried by a stream of a mobile phase and introduced into a column where a target component contained in the liquid sample is temporally separated from other components. In a mass separation unit, the target component eluted from the column at a predetermined time is ionized by an ion source, separated according to the mass-to-charge ratio, and measured. In liquid chromatograph mass spectrometry, an atmospheric pressure ion source combined with an ESI probe or the like is often used for ease of handling.

The ions generated by the atmospheric pressure ion source are focused by an ion transport optical system communicated via an ion introduction opening. Then, the ions are introduced into the mass separation unit, separated according to the mass-to-charge ratio, and then, measured. At this time, not only ions derived from the target component but also ions and neutral molecules derived from components (mobile phase, solvent of liquid sample, etc.) other than the component to be analyzed contained in the liquid sample are also introduced into the ion transport optical system and the mass separation unit located in the subsequent stage of the ion transport optical system. Although the ion transport optical system and the mass separation unit are evacuated by a vacuum pump, some of the introduced components still adhere to an interface unit, a lens system, and the like of the ion transport optical system. In particular, since the ion transport optical system is provided at a position close to the ionization chamber, components other than the component to be analyzed are likely to flow into the ion transport optical system, and thus, the ion transport optical system is likely to be contaminated. For example, if the lens system of the ion transport optical system is contaminated with deposits, the focusing efficiency of ion beam is degraded, which reduces the amount of ions introduced into the mass separation unit, and lowers the sensitivity. In addition, when an electrode in the mass separation unit is contaminated with deposits, the measurement sensitivity is also lowered. In view of this, after the execution of mass spectrometry for a certain period of time, it is necessary to release an evacuation system to open the ion transport optical system and the mass separation unit to the atmosphere, and clean the inside.

Once the evacuation system is released, it takes time to achieve evacuation to an adequate vacuum level to resume measurement. The measurement cannot be performed during such time (down-time). Therefore, it is required to minimize contamination of the ion transport optical system and the mass separation unit to reduce down-time for cleaning.

Patent Literature 1 discloses, in a liquid chromatograph mass spectrometer provided with an ESI probe as an ion source, switching the voltage applied to the ESI probe and switching the supplying state and non-supplying state of a nebulizer gas to the ESI probe between a time period in which a target component is eluted from a liquid chromatograph and the other time period. Specifically, a first mode is executed during the time period in which the target component is eluted and a second mode is executed during the other time period, where, in the first mode, the nebulizer gas is supplied while a predetermined voltage is applied to the ESI probe, and, in the second mode, the application of the voltage to the ESI probe and the supply of the nebulizer gas are stopped. In the first mode, charged droplets generated due to nebulization of the eluate from the liquid chromatograph containing the target component are gasified and ionized. In the second mode, the eluate from the liquid chromatograph is allowed to flow down from the ESI probe. In this liquid chromatograph mass spectrometer, since only the eluate containing the target component is introduced into the mass spectrometer, contamination inside the apparatus such as an ion transport optical system can be minimized, and the down-time for cleaning can be shortened.

CITATION LIST

Patent Literature

Patent Literature 1: US 2015/0144781 A1
Patent Literature 2: JP 2015-75348 A
Patent Literature 3: WO 2016/002647 A1

SUMMARY OF INVENTION

Technical Problem

Liquid chromatograph mass spectrometers are also widely used for analysis of peptides. When a peptide is analyzed, as a pretreatment step, a protease or denaturant may be used to cleave the peptide at a predetermined amino acid position, or a salt or surfactant for adjusting pH may be used to dissolve the peptide. When the liquid sample subjected to such pretreatment is directly introduced into the liquid chromatograph mass spectrometer disclosed in Patent Literature 1, the denaturant or the like contained in the eluate is deposited at the tip of the probe when the elute flows down from the probe during the execution of the second mode. As a result, the outlet of the probe may be clogged, or the deposits may reduce the stability of the spraying when the first mode is performed. Such a problem can be avoided by performing a pretreatment for removing the denaturant or the like before the liquid sample is introduced into the liquid chromatograph unit. However, such a pretreatment is time- and labor-consuming, and it is also necessary to consider loss of the target component during the pretreatment process.

Although a liquid chromatograph mass spectrometer has been described herein as an example, the same problems as described above have been generally faced by apparatuses for obtaining charged particles from an eluate eluted from component separation units that temporally separate components contained in a liquid sample, and introducing the charged particles into charged particle analysis units provided in a subsequent stage through charged particle introduction openings. Examples of such apparatuses include ion mobility spectrometers (for example, Patent Literature 2) and classifiers (for example, Patent Literature 3).

The problem addressed by the present invention is to provide a charged-particle supply control method and a charged-particle supply control device for obtaining charged particles from an eluate eluted from a component separation unit that temporally separates components contained in a liquid sample, and introducing the charged particles to a charged particle analysis unit provided at a subsequent stage through a charged particle introduction opening, the charged-particle supply control method and the charged-particle supply control device being capable of preventing contamination of the inside of the charged particle analysis unit, and not requiring a special pretreatment for the liquid sample containing a low-volatility component.

Solution to Problem

The first aspect of the present invention aimed at solving the previously described problem is a charged-particle supply control method for introducing into a probe an eluate eluted from a component separation unit that temporally separates components contained in a liquid sample, for obtaining charged particles, and for delivering the charged particles to a charged particle analysis unit provided at a subsequent stage through a charged particle introduction opening, comprising steps of:

a) supplying a gasification promoting gas for promoting gasification of the eluate and applying a predetermined charged-particle obtaining voltage to the probe or to a needle disposed between the probe and the charged particle introduction opening while the eluate is being introduced into the probe; and b) hindering the eluate nebulized by the probe from moving toward the charged particle introduction opening only in a time period other than a time period in which a target-component containing eluate is introduced into the probe.

The component separation unit is, for example, a column of a liquid chromatograph. The charged particle analysis unit is, for example, a mass spectrometer, an ion mobility spectrometer, or a classifier. The probe is, for example, an ESI probe or an APCI probe. When the ESI probe is used, the eluate is ionized by applying an ionization voltage (or a charged-particle obtaining voltage) to the ESI probe to charge the eluate while nebulizing the eluate with the gasification promoting gas. When the APCI probe is used, the eluate is nebulized by the gasification promoting gas, and a voltage (corona voltage) is applied to a needle (corona needle) disposed between the APCI probe and the ion (or charged particle) introduction opening to cause a corona discharge. Thus, the mobile phase molecules contained in the eluate nebulized by the APCI probe are ionized, and through charge exchange between the ionized mobile phase molecules and component molecules, the component molecules are ionized. The ESI probe that may be used here is not limited to an independent ESI probe (micro ESI probe) provided separately from the component separation unit (or column); it may be a probe (nano ESI probe) integrated with the column.

The time period in which the target-component containing eluate is introduced (for example, the retention time in case the component separation unit is a liquid chromatograph) can be determined in advance by referring to a database, or by performing a preliminary measurement.

Hindering the eluate from moving toward the charged particle introduction opening can be achieved by spraying an interfering gas in a direction intersecting (for example, perpendicular to) the gas stream of the eluate which is nebulized by the probe and moves toward the charged particle introduction opening, for example. It is preferable to use an inert gas such as nitrogen gas as the interfering gas. Alternatively, the eluate can also be hindered from moving toward the charged particle introduction opening by sucking away the gas stream of the eluate nebulized by the probe and moving toward the charged particle introduction opening.

In the charged-particle supply control method according to the present invention, while the eluate from the component separation unit is being introduced into the probe, irrespective of whether the target component is contained in the elute, a predetermined voltage is applied to the probe or the needle and the gasification promoting gas is continuously supplied in order to gasify the eluate and obtain charged particles. Even when a low-volatility component such as a denaturant, a salt, or a surfactant is dissolved in the eluate, the eluate quickly moves away when it flows out from the tip of the probe, and thus, there is less possibility of such component being deposited on the tip of the probe to clog the outlet of the probe or to cause instable spraying. In addition, during a time period other than the time period in which the target-component containing eluate is introduced into the probe, ions or neutral molecules generated from the eluate are prevented from flowing into the ion analysis unit through the charged particle introduction opening by supplying the interfering gas or by sucking away the gas stream of the eluate, whereby contamination of the inside of the charged particle analysis unit (for example, ion transport optical system or mass separation unit) by the components other than the target component is prevented.

The second aspect of the present invention aimed at solving the previously described problem is a charged-particle supply control device configured to obtain charged particles from an eluate eluted from a component separation unit that temporally separates components contained in a liquid sample, and to deliver the charged particles to a charged particle analysis unit provided at a subsequent stage through a charged particle introduction opening, the device including:

a) a probe configured such that the eluate from the component separation unit is introduced;

b) a voltage application unit configured to apply a predetermined charged-particle obtaining voltage to the probe:

c) a gasification promoting gas supply unit configured to apply a gasification promoting gas for promoting gasification of the eluate flowing out of the probe;

d) a charged particle introduction hindering unit configured to hinder the eluate nebulized by the probe from moving toward the charged particle introduction opening; and e) an analysis control unit configured to control the voltage application unit and the gasification promoting gas supply unit such that, while the eluate is being introduced into the probe, the charged-particle obtaining voltage is applied and the gasification promoting gas is supplied, and to control the charged particle introduction hindering unit such that, only in a time period other than a time period in which a target-component containing eluate is introduced into the probe, the eluate is hindered from moving toward the charged particle introduction opening.

The third aspect of the present invention aimed at solving the previously described problem is a charged-particle supply control device configured to obtain charged particles from an eluate eluted from a component separation unit that temporally separates components contained in a liquid sample, and to deliver the charged particles to a charged particle analysis unit provided at a subsequent stage through a charged particle introduction opening, the device including:

a) a probe configured such that the eluate from the component separation unit is introduced;

b) a needle that is conductive and is disposed between the probe and the charged particle introduction opening:

c) a voltage application unit configured to apply a predetermined charged-particle obtaining voltage to the needle;

d) a gasification promoting gas supply unit configured to supply a gasification promoting gas for promoting gasification of the eluate flowing out of the probe:

e) a charged particle introduction hindering unit configured to hinder the eluate nebulized by the probe from moving toward the charged particle introduction opening; and f) an analysis control unit configured to control the voltage application unit and the gasification promoting gas supply unit such that, while the eluate is being introduced into the probe, the charged-particle obtaining voltage is applied and the gasification promoting gas is supplied, and to control the charged particle introduction hindering unit such that, only in a time period other than a time period in which a target-component containing eluate is introduced into the probe, the eluate is hindered from moving toward the charged particle introduction opening.

Advantageous Effects of Invention

When the charged-particle supply control method or the charged-particle supply control device according to the present invention is used, contamination of the inside of the charged particle analysis unit can be prevented. In addition, even when the liquid sample contains a component that is likely to deposit, it is not necessary to perform a pretreatment for removing such a component.

DESCRIPTION OF EMBODIMENTS

Hereinafter, embodiments of a charged-particle supply control method and a charged-particle supply control device according to the present invention will be described with reference to the drawings. The charged-particle supply control method and the charged-particle supply control device according to the present embodiment are an ion supply control method and an ion supply control device. The ion supply control device according to the present embodiment is provided at an interface section between a liquid chromatograph unit (LC) and a mass spectrometry unit (MS) in a liquid chromatograph mass spectrometer, and is used as a device for ionizing a component temporally separated in a column of the liquid chromatograph unit and delivering the ionized component to the mass spectrometry unit.

Figure 1:
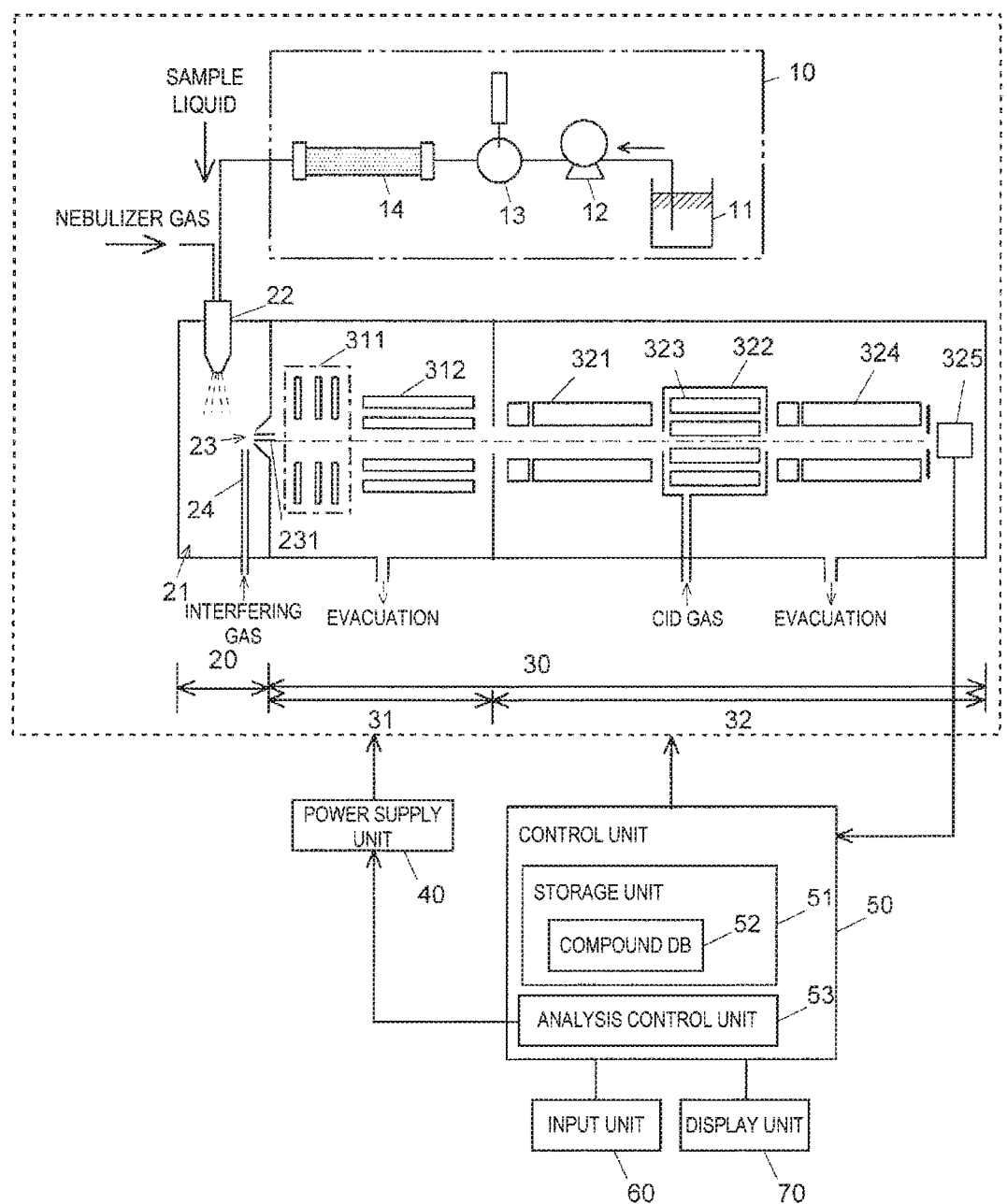
FIG. 1 is a schematic diagram illustrating the configuration of a liquid chromatograph mass spectrometer provided with an ion supply control device which is one embodiment of the charged-particle supply control device according to the present invention.

FIG. 1 is a schematic diagram illustrating the configuration of a liquid chromatograph mass spectrometer provided with the ion supply control device according to the present embodiment. A liquid sample introduced from an injector 13 of a liquid chromatograph unit 10 is carried by a stream of a mobile phase supplied by a pump 12 from a mobile phase container 11 at a constant speed, and is introduced into a column 14 where the components are temporally separated. The eluate (mixed liquid of the separated component in the liquid sample and the mobile phase) from the column 14 is delivered to an ionization probe 22 of an ion source 20, nebulized from the tip of the ionization probe 22 into an ionization chamber 21, and ionized. The fine droplets containing the generated ions are delivered to a mass spectrometry unit 30 located in the subsequent stage through an ion introduction opening 23 formed in a partition wall provided between the ionization chamber 21 and the mass spectrometry unit 30. A desolvation pipe 231 is provided at the center of the ion introduction opening 23. Further, a heated drying gas is sprayed to the desolvation pipe 231 from the mass spectrometry unit 30 side toward the ionization chamber 21, whereby desolvation of the components nebulized from the ionization probe 22 is further promoted. Use of such a drying gas can prevent neutral particles and low molecular ions derived from a solvent from entering an ion transport optical system 31 and the like in the subsequent stage. In contrast, however, an amount of introduced ions derived from the target component also decreases. Therefore, it is preferable to appropriately determine whether the drying gas is used or not, and if used, the flow rate of the drying gas, depending on the amount of the target component.

The mass spectrometry unit 30 is provided with the ion transport optical system 31 that sends, while focusing, the ions introduced through the ion introduction opening 23 (and the desolvation pipe 231) to the next stage, and a mass separation unit 32 that performs mass spectrometry of the ions passing though the ion transport optical system 31. The ion transport optical system 31 includes an ion lens 311 and a multipole ion guide 312. The mass separation unit 32 is a so-called triple quadrupole mass spectrometry unit provided with a first quadrupole mass filter (Q1) 321 which separates ions according to the mass-to-charge ratio, a second quadrupole mass filter (Q3) 324 which similarly separates ions according to the mass-to-charge ratio, and an ion detector 325. The first quadrupole mass filter (Q1) 321 and the second quadrupole mass filter (Q3) 324 are arranged to hold a collision cell 322 between them. The collision cell 322 has multipole ion guides (q2) 323 inside. The internal space of the mass separation unit 30 is maintained at a predetermined high vacuum by a vacuum pump (not shown) during the execution of analysis.

A control unit 50 includes a storage unit 51 and an analysis control unit 53 which is a functional block. A compound database 52 is stored in the storage unit 51. The compound database 52 stores analysis conditions (type of mobile phase, flow rate, type of column, etc.) and retention times of a plurality of compounds in association with each other. The analysis control unit 53 controls an analysis operation in response to an input instruction from the user. For example, the analysis control unit 53 performs an operation such as injecting a liquid sample from the injector 13 or transmitting a control signal to a power supply unit 40 to apply a predetermined voltage to the liquid chromatograph unit 10 and the mass spectrometry unit 30. The control unit 50 is a personal computer, and the analysis control unit 53 is implemented by operating an analysis control program stored in the storage unit 51. Further, an input unit 60 and a display unit 70 are connected to the control unit 50.

Figure 2:
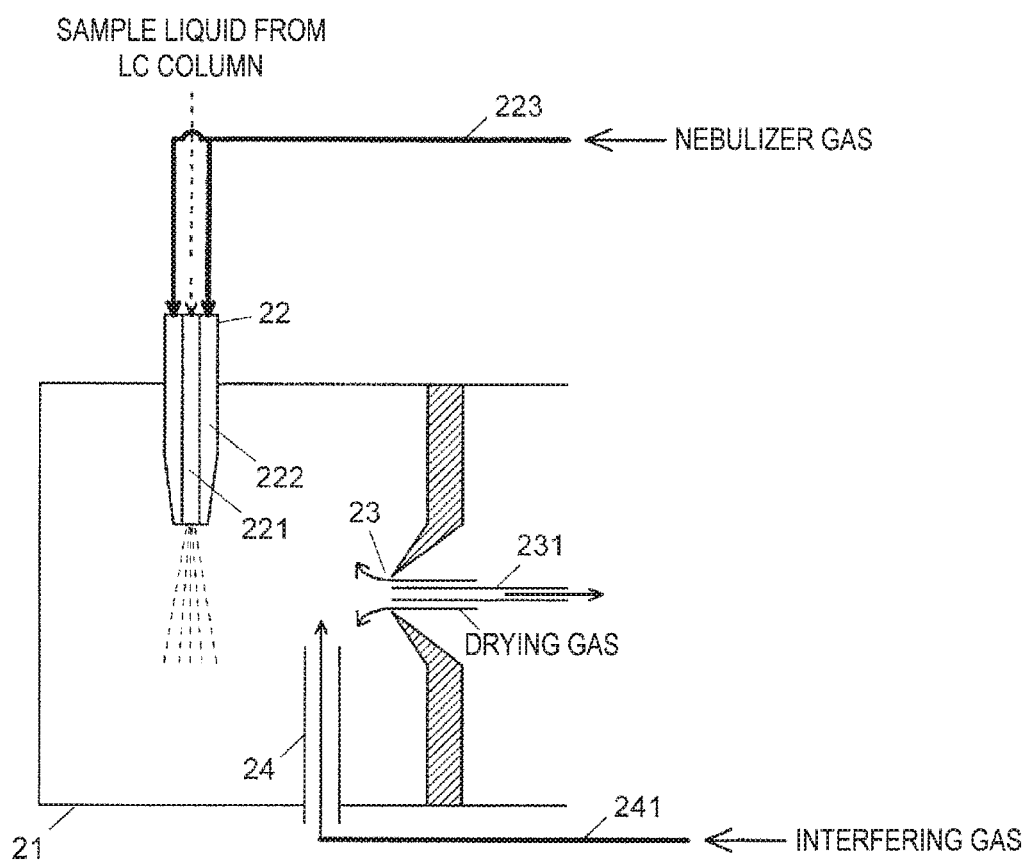
FIG. 2 is an enlarged view of the ion supply control device in the embodiment of the present invention.

FIG. 2 is an enlarged view of the ion source 20 used in the present embodiment.

The ion source 20 is a device (electrospray ion source) for ionizing sample components contained in the eluate (mixed liquid of separated sample components and mobile phase) from the column 14 of the liquid chromatograph unit 10 by ESI (electrospray ionization), and includes an ESI probe (ionization probe) 22 which is provided with a sample delivery pipe 221 through which the eluate from the column 14 flows, and a nebulizer gas supply pipe 222 provided so as to cover the outer peripheral part of the sample delivery pipe 221. The ESI probe has a tip to which a high DC voltage (ESI voltage) of several kV is applied. A nebulizer gas supply line 223 for supplying a nebulizer gas such as nitrogen gas is connected to the nebulizer gas supply pipe 222.

When reaching the tip of the sample delivery pipe 221 of the ESI probe 22, the eluate introduced into the sample delivery pipe 221 is charged by the high voltage. The eluate is also nebulized by being sprayed with the nebulizer gas released from the nebulizer gas supply pipe 222, released into the ionization chamber 21, and ionized.

In addition, an interfering gas supply pipe 24 is disposed in front of the ion introduction opening 23 along the partition wall between the ionization chamber 21 and the mass spectrometry unit 30 located in the subsequent stage. An interfering gas supply line 241 for delivering an interfering gas, which is an inert gas such as nitrogen gas, is connected to the interfering gas supply pipe 24.

Figure 3:
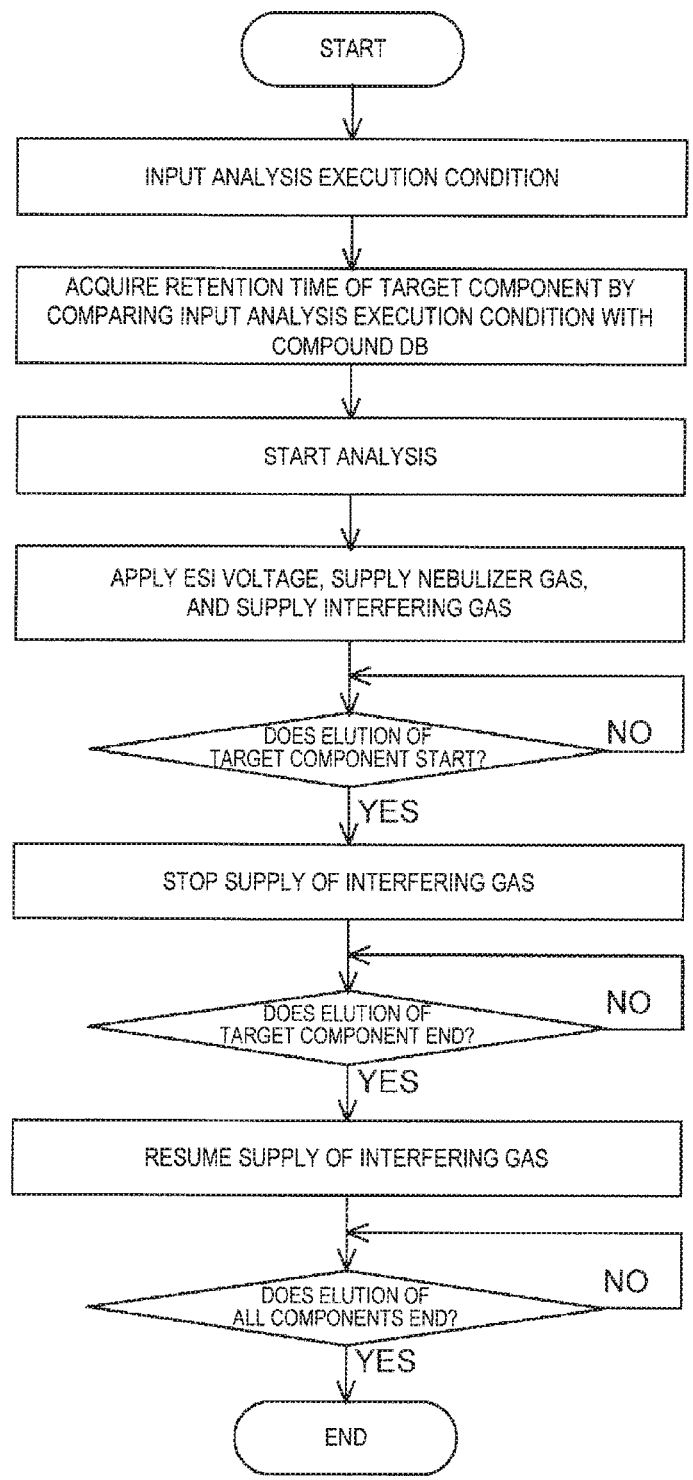
FIG. 3 is a flow chart showing an ion supply control method which is an embodiment of the charged-particle supply control method according to the present invention.

A characteristic operation of the liquid chromatograph mass spectrometer in the present embodiment will be described with reference to the flowchart in FIG. 3.

Prior to the start of analysis, a user inputs analysis execution conditions (name of target component, type of mobile phase, flow rate of mobile phase, type of column, etc.) using the input unit 60 (step S1). When the user finishes the input of analysis execution conditions, the analysis control unit 53 creates a method file containing the analysis execution conditions, and stores the method file in the storage unit 51. The analysis control unit 53 also reads information matching the input analysis execution conditions from the compound database 52, and acquires the retention time of the target component contained in the information (step S2). More precisely, the analysis control unit 53 stores the time at which the target component starts to elute from the column (elution start time) and the time at which the elution from the column ends (elution end time).

When the user instructs the start of analysis, the analysis control unit 53 injects a liquid sample from the injector 13 (step S3). The sample injected from the injector 13 is carried by a stream of a mobile phase and introduced into the column 14 where components are temporally separated. The components eluted from the column 14 are introduced into the ESI probe 22 and are turned into charged droplets by application of the ESI voltage and supply of the nebulizer gas. The charged droplets are nebulized into the ionization chamber 21 and ionized.

The analysis control unit 53 controls the respective units such that, at the start of the analysis, a predetermined ESI voltage is applied to the ESI probe 22, a nebulizer gas at a predetermined flow rate is supplied to the nebulizer gas supply pipe 222, and a nitrogen gas at a predetermined flow rate is supplied to the interfering gas supply pipe 24 (step S4). The charged droplets nebulized from the ESI probe 22 are pushed away by the interfering gas and do not enter the ion introduction opening 23.

When the elution start time of the target component is reached after the start of analysis (YES in step S5), the analysis control unit 53 stops the supply of the interfering gas from the interfering gas supply source so as to stop the supply of the interfering gas into the ionization chamber 21 from the interfering gas supply pipe 24 (step S6). Thereafter, when the elution end time of the target component is reached (YES in step S7), the analysis control unit 53 resumes the supply of nitrogen gas from the interfering gas supply source, so that the supply of the interfering gas from the interfering gas supply pipe 24 to the ionization chamber 21 is resumed (step S8). As described above, since the interfering gas is not supplied from the interfering gas supply pipe 24 to the ionization chamber 21 in the time period in which the target component is eluted, ions derived from the target component contained in the charged droplets nebulized from the ESI probe 22 are delivered to the mass spectrometry unit 30 through the ion introduction opening 23 due to the pressure difference between the ionization chamber 21 and the mass spectrometry unit 30. Then, after all the components are eluted from the column 14 (YES in step S9), the measurement is ended. If it is not necessary to release the component remaining in the column 14 by the measurement, such as if the inside of the column 14 is cleaned after completion of the measurement, the measurement may be terminated when the elution of the target component ends.

In the ion supply control method and ion supply control device according to the present embodiment, while the eluate from the column 14 of the liquid chromatograph unit 10 is introduced into the ESI probe 22, the analysis control unit 53 applies the predetermined ESI voltage to the ESI probe 22 and continues to supply the nebulizer gas, regardless of whether the target component is eluted or not. In addition, the analysis control unit 53 supplies the interfering gas from the interfering gas supply pipe 24 to the ionization chamber 21 in a time period other than the time period in which the target component is eluted, thereby preventing ions or neutral molecules generated from the eluate from flowing into the mass spectrometry unit 30 through the ion introduction opening 23. Therefore, it is possible to prevent the inside of the mass spectrometry unit 30 from being contaminated by components other than the target component. Accordingly, it is possible to reduce the frequency of releasing the high vacuum in order to clean the inside of the mass spectrometry unit 30, and to reduce the down-time. In addition, even when the liquid sample contains a low-volatility component such as a denaturant, a salt, or a surfactant, such a component quickly moves away when it flows out from the tip of the ESI probe 22, and thus, there is less possibility of such component being deposited on the tip of the probe to clog the outlet of the probe or to cause instable spraying.

While the above embodiment describes the ion source using the common ESI probe (micro ESI probe) 22, another atmospheric pressure ion source can also be configured in a similar way. Hereinafter, a configuration example including a nano ESI probe 22a will be described with reference to FIG. 4, and a configuration example including an APCI probe 22b will be described with reference to FIG. 5. The same components as those in the above embodiment are indicated by the same reference numerals and the detailed description thereof is omitted. Here, ion sources using electrospray ionization and atmospheric pressure chemical ionization that are particularly widely used as atmospheric pressure ion sources will only be described. However, ion sources using various other methods such as atmospheric pressure photo ionization (APPI) can also be configured in a similar way.

Figure 4:
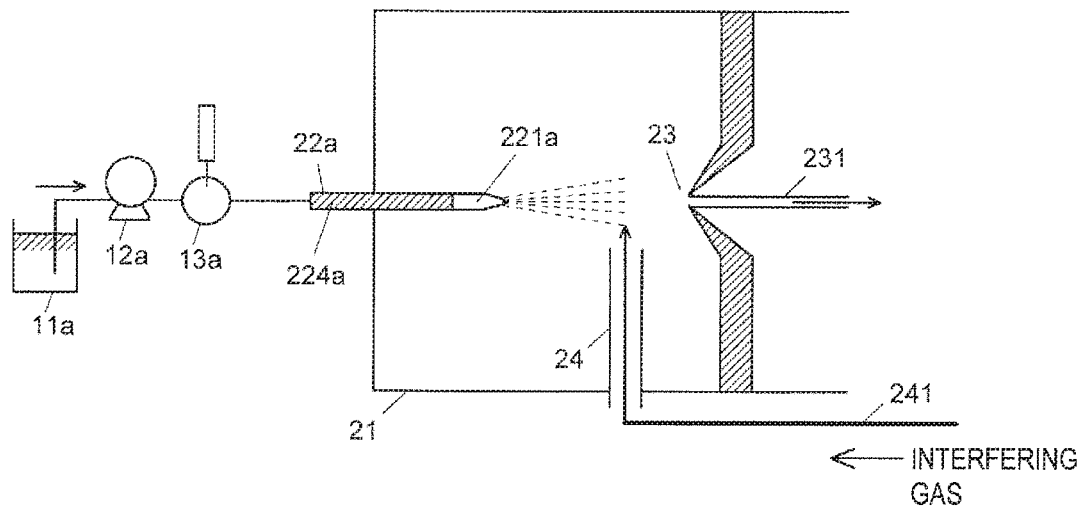
FIG. 4 is a diagram showing another embodiment of the charged-particle supply control device according to the present invention.

FIG. 4 shows an ion source provided with a nano ESI probe 22a used for measuring a very small amount of liquid sample. In the nano ESI probe 22a, a column 224a for separating various components contained in a liquid sample is provided in the probe 22a. The liquid sample is carried by a stream of a mobile phase supplied by a pump 12a from a mobile phase container 11a at a constant rate and introduced from an injector 13a into the column 224a where the components are separated. Then, the liquid sample is delivered to the tip of the nano ESI probe 22a through a sample delivery pipe 221a, nebulized into the ionization chamber 21, and ionized. Further, as in the above embodiment, under the control of the analysis control unit 53, an ESI voltage is constantly applied from the power supply unit 40 to the nano ESI probe 22a during analysis. In addition, in the time period other than the time period in which the target component is eluted, an interfering gas is supplied from the interfering gas supply pipe 24 via the interfering gas supply line 241. This configuration also prevents ions and neutral molecules, which are generated from the eluate during the time period other than the time period in which the target component is eluted, from flowing into the mass spectrometry unit 30 through the ion introduction opening 23. Therefore, it is possible to prevent the inside of the mass spectrometry unit 30 from being contaminated by components other than the target component.

Figure 5:
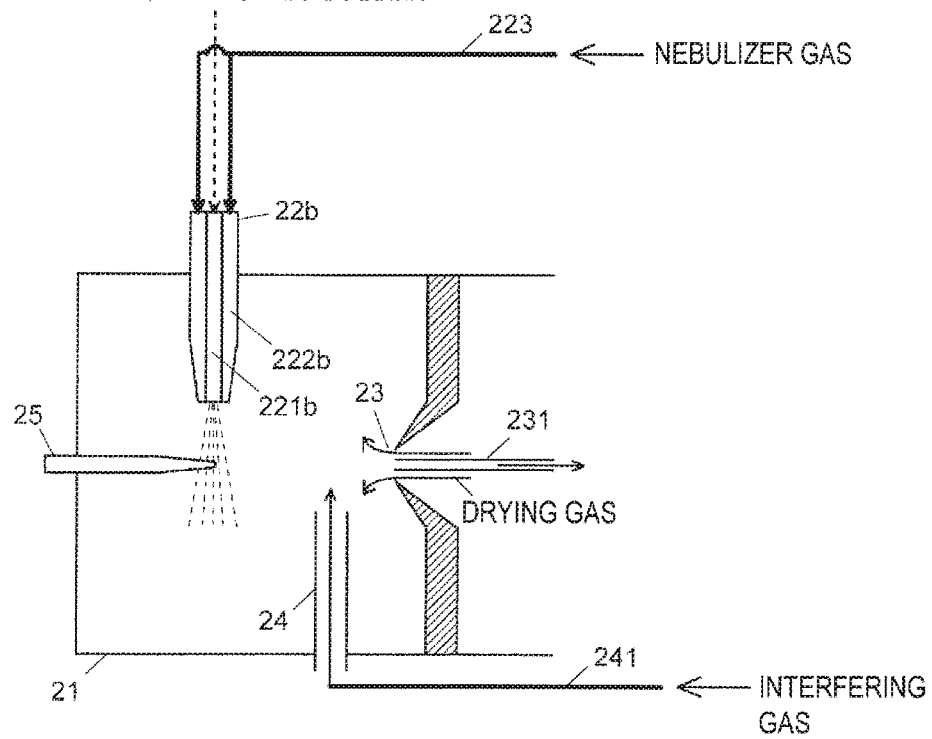
FIG. 5 is a diagram showing still another embodiment of the charged-particle supply control device according to the present invention.

FIG. 5 shows a configuration example for generating ions by atmospheric pressure chemical ionization (APCI), and this configuration is provided with an APCI probe 22b and a corona needle 25. Similar to the embodiment using the micro ESI probe 22, various components contained in a liquid sample are separated by the column 14 of the liquid chromatograph unit 10, and sequentially introduced into a sample delivery pipe 221b of the APCI probe 22b. The eluate introduced into the APCI probe 22b is nebulized into the ionization chamber 21 by a nebulizer gas from a nebulizer gas supply pipe 222b. In the vicinity of the outlet end of the APCI probe 22b, a corona needle 25 to which a predetermined high voltage (APCI voltage) is applied is disposed. The molecules of the solvent such as the mobile phase contained in the eluate nebulized from the APCI probe 22b are ionized in a corona discharge region. Various components contained in the liquid sample are ionized by charge exchange with ionized solvent molecules, and are delivered to the mass spectrometry unit 30 through the ion introduction opening 23. In this configuration, the operation of the analysis control unit 53 is the same as that described above, and this configuration can also prevent the inside of the mass spectrometry unit 30 from being contaminated by components other than the target component.

Figure 6:
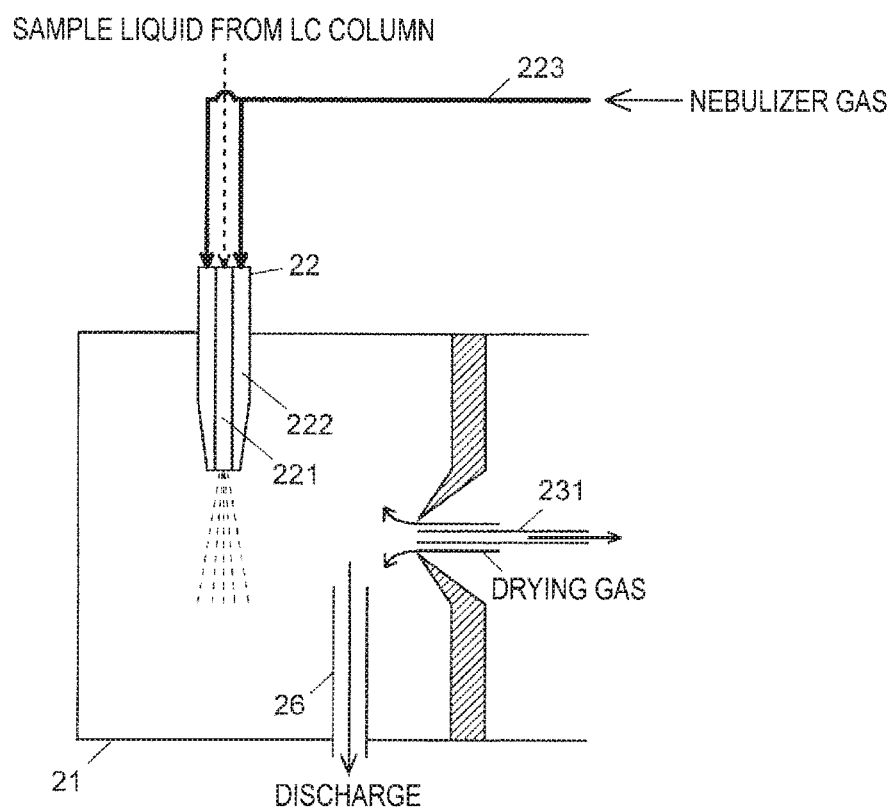
FIG. 6 is a diagram showing still another embodiment of the charged-particle supply control device according to the present invention.

The above embodiments describe the configuration for preventing the eluate nebulized from the ionization probe 22 from moving toward the ion introduction opening 23 by spraying the interfering gas supplied from the interfering gas supply pipe 24 to the eluate. However, as shown in FIG. 6, the eluate nebulized from the ionization probe can also be prevented from moving toward the ion introduction opening 23 by a configuration in which the interfering gas supply pipe is used as an intake pipe 26, and the gasified eluate is discharged before the ion introduction opening 23. Although FIG. 6 shows an example in combination with the ESI probe 22, the abovementioned configuration can be similarly combined with other ion sources such as the nano ESI probe 22a and the APCI probe 22b.

Next, the results of the measurement performed by the present inventor to confirm the effects of the ion supply control method and the ion supply control device according to the present invention will be described. In this measurement, a liquid chromatograph mass spectrometer (see FIG. 4) provided with the nano ESI probe 22a was used. In addition, a 0.1% formic acid/20% acetonitrile solution was used as a mobile phase, and the flow rate of the mobile phase was set to 1 µL/min. A solution prepared by dissolving 2 pmol/µL of ACTH 18-39 (molecular weight: 2465.70, structural formula: Arg-Pro-Val-Lys-Val-Try-Pro-Asn-Gly-Ala-Glu-Asp-Glu-Ser-Ala-Glu-Ala-Phe-Pro-Leu-Glu-Phe-, molecular formula: $C_{112}H_{165}N_{27}O_{36}$) into 0.1% formic acid/ 20% acetonitrile was used as a sample, and the prepared solution was continuously injected to obtain total ion chromatogram and mass spectrum. During the measurement, the interfering gas was supplied to the ionization chamber in the period between 22.20 min and 23.00 min, and the difference in measurement intensity of the ions was measured to determine the difference in the amount of ions introduced into the mass separation unit depending on the presence or absence of the interfering gas.

Figure 7A:
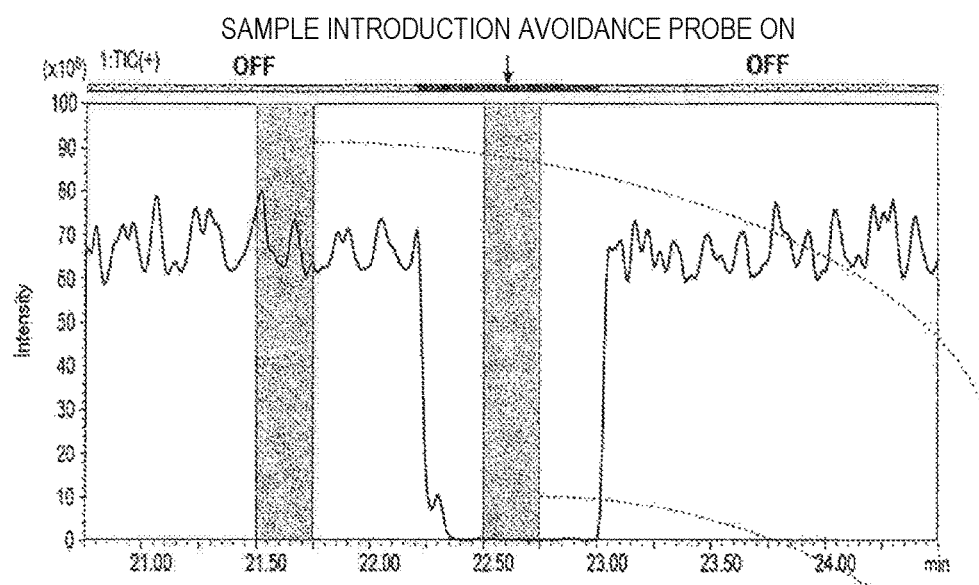
FIGS. 7A-7C are diagrams showing measurement results obtained using the ion supply control method and device according to the embodiment of the present invention.
Figure 7B:
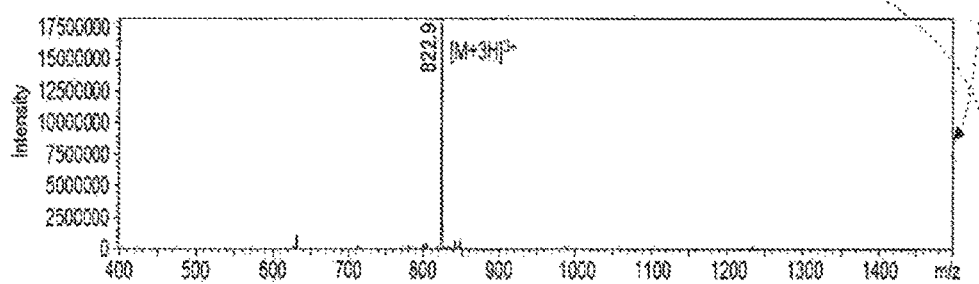
Figure 7C:
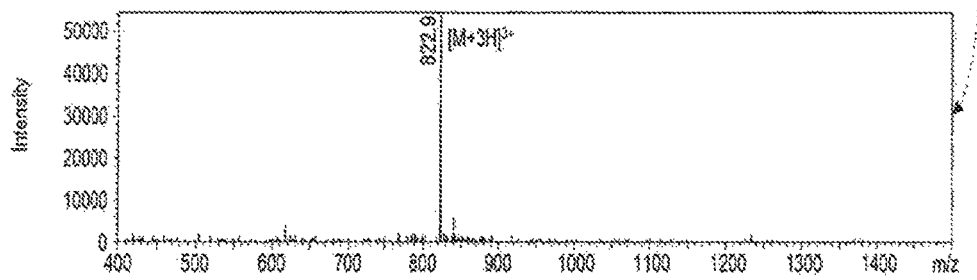

FIGS. 7A-7C show the measurement results. FIG. 7A shows a part (20.5 min to 24.50 min) of the total ion chromatogram. It can be seen from the total ion chromatogram that the ion detection intensity is greatly reduced during the time period (22.20 min to 23.00 min) in which the interfering gas is supplied. FIG. 7B shows a mass spectrum acquired during the period between 21.50 min and 21.75 min (the interfering gas was not supplied), and FIG. 7C shows a mass spectrum acquired during the period between 22.50 min and 22.75 min (the interfering gas was supplied). These spectra were obtained to confirm that the ions detected during the measurement were ions derived from the sample (ACTH 18-39), and it was confirmed that trivalent ions derived from the sample (ACTH 18-39) were detected in both time periods. Further, it can be seen from the comparison between FIG. 7B and FIG. 7C that, due to the supply of the interfering gas, the detection intensity of the ions, that is, the amount of the ions introduced into the mass spectrometry unit 30, is suppressed to about $1/350$.

The embodiments described above are merely examples, and can be appropriately modified in accordance with the spirit of the present invention.

The above embodiments describe, as an example, a liquid chromatograph mass spectrometer including, in combination, a liquid chromatograph and a triple quadrupole mass spectrometer. However, a component separation unit other than the liquid chromatograph may be used, as long as it can temporally separate a target component contained in a sample from other components. For example, a mass spectrometer other than the triple quadrupole type or another ion analyzer such as an ion mobility analyzer may be used. Alternatively, the same configuration as described above can be adopted not only for a device for analyzing ions but also for a device (classifier, for example) for analyzing charged particles.

In the above embodiments, the interfering gas is supplied along the partition wall between the ionization chamber and the mass spectrometry unit. However, the supplying direction of the interfering gas is not limited to the direction in the above embodiments, and the interfering gas may be supplied in any direction, as long as the interfering gas can prevent the eluate nebulized from the ionization probe from moving toward the ion introduction opening, that is, the interfering gas intersects the gas stream of the eluate nebulized from the ionization probe and moving toward the ion introduction opening. Moreover, in the above embodiments, only the supply of the interfering gas is changed in a time period other than the time period in which the target component is introduced. However, the present invention can be configured such that, in addition to the above configuration, a flow rate of drying gas is increased in the time period other than the time period in which the target component is introduced, so as to also prevent the introduction of ions to the ion introduction opening by the drying gas.

In the above embodiments, the storage unit is provided with the compound database, and the retention time of the target component is obtained from the compound database based on the analysis execution condition input by the user. Alternatively, previous measurement data may be accumulated in the storage unit, and the retention time of the target component may be obtained from the accumulated data, or the user may directly input the retention time of the target component.

The above embodiments describe only the operation at the time of measurement of the sample. However, when a cleaning solution is introduced into the ionization probe for the purpose of cleaning the inside of the ionization probe, or for another purpose, the interfering gas may also be used to prevent ions or other components derived from the cleaning solution from entering the mass spectrometry unit. In this case, the cleaning solution does not contain the target component, and the time period in which the cleaning solution is introduced corresponds to the time period other than the time period in which a target-component containing eluate is introduced into the ionization probe. Therefore, the interfering gas is constantly supplied.

REFERENCE SIGNS LIST

10 . . . Liquid Chromatograph Unit
11, 11a . . . Mobile Phase Container
12, 12a . . . Pump
13, 13a . . . Injector
14 . . . Column
20 . . . Ion Source
21 . . . Ionization Chamber
22 . . . ESI Probe
22a . . . Nano ESI Probe
22b . . . APCI Probe
221, 221a, 221b . . . Sample Delivery Pipe
222, 222b . . . Nebulizer Gas Supply Pipe
223 . . . Nebulizer Gas Supply Line
224a . . . Column
23 . . . Ion Introduction Opening
231 . . . Desolvation Pipe
24 . . . Interfering Gas Supply Pipe
241 . . . Interfering Gas Supply Line
25 . . . Corona Needle
26 . . . Intake Pipe
30 . . . Mass Spectrometry Unit
31 . . . Ion Transport Optical System
311 . . . Ion Lens
312 . . . Multipole Ion Guide
32 . . . Mass Separation Unit
321 . . . First Quadrupole Mass Filter
322 . . . Collision Cell
323 . . . Multipole Ion Guide
324 . . . Second Quadrupole Mass Filter
325 . . . Detector
40 . . . Power Supply Unit
50 . . . Control Unit
51 . . . Storage Unit
52 . . . Compound Database
53 . . . Analysis Control Unit
60 . . . Input Unit
70 . . . Display Unit

The invention claimed is:

1. A charged-particle supply control method for introducing into a probe an eluate eluted from a column of a liquid chromatograph that temporally separates components contained in a liquid sample, for obtaining charged particles, and for delivering the charged particles to a charged particle analyzer provided at a subsequent stage through a charged particle introduction opening, comprising steps of:
   a) supplying gasification promoting gas for promoting gasification of the eluate and applying a predetermined charged-particle obtaining voltage to the probe or to a needle disposed between the probe and the charged particle introduction opening while the eluate is being introduced into the probe, regardless of whether a target-component is introduced into the probe; and
   b) hindering the eluate nebulized by the probe from moving toward the charged particle introduction opening only in a time period other than a time period in which the target-component is introduced into the probe, where an interfering gas supply line is configured to blow an interfering gas in a direction intersecting an axis of the charged particles entering into the charged particle introduction opening, the interfering gas being blown from a position different from a position of the charged particle introduction opening.

2. A charged-particle supply control device configured to obtain charged particles from an eluate eluted from a column of a liquid chromatograph that temporally separates components contained in a liquid sample, and to deliver the charged particles to a charged particle analyzer provided at a subsequent stage through a charged particle introduction opening, the device comprising:
   a) a probe configured such that the eluate from the column is introduced;
   b) a voltage source configured to apply a predetermined charged-particle obtaining voltage to the probe;
   c) a gasification promoting gas supply line configured to supply a gasification promoting gas for promoting gasification of the eluate flowing out of the probe;
   d) an interfering gas supply line configured to hinder the eluate nebulized by the probe from moving toward the charged particle introduction opening, where the interfering gas supply line is configured to blow an interfering gas in a direction intersecting an axis of the charged particles entering into the charged particle introduction opening, the interfering gas being blown from a position different from a position of the charged particle introduction opening; and e) a processor configured to implement an analysis control unit configured to control the voltage source and the gasification promoting gas supply line such that, while the eluate is being introduced into the probe, regardless of whether a target-component is introduced into the probe, the charged-particle obtaining voltage is applied and the gasification promoting gas is supplied, and to control the interfering gas supply line to blow the interfering gas such that, only in a time period other than a time period in which the target-component is introduced into the probe, the eluate is hindered from moving toward the charged particle introduction opening.

3. A charged-particle supply control device configured to obtain charged particles from an eluate eluted from a column of a liquid chromatograph that temporally separates components contained in a liquid sample, and to deliver the charged particles to a charged particle analyzer provided at a subsequent stage through a charged particle introduction opening, the device comprising:

a) a probe configured such that the eluate from the column is introduced;

b) a needle which is conductive and disposed between the probe and the charged particle introduction opening;

c) a voltage source configured to apply a predetermined charged-particle obtaining voltage to the needle;

d) a gasification promoting gas supply line configured to supply a gasification promoting gas for promoting gasification of the eluate flowing out of the probe;

e) an interfering gas supply line configured to hinder the eluate nebulized by the probe from moving toward the charged particle introduction opening, where the interfering gas supply line is configured to blow an interfering gas in a direction perpendicular to an axis of the charged particles entering into the charged particle introduction opening; and f) a processor configured to implement an analysis control unit configured to control the voltage source and the gasification promoting gas supply line such that, while the eluate is being introduced into the probe, regardless of whether a target-component is introduced into the probe, the charged-particle obtaining voltage is applied and the gasification promoting gas is supplied, and to control the interfering gas supply line to blow the interfering gas such that, only in a time period other than a time period in which the target-component is introduced into the probe, the eluate is hindered from moving toward the charged particle introduction opening.

4. A charged-particle supply control device configured to obtain charged particles from an eluate eluted from a column of a liquid chromatograph that temporally separates components contained in a liquid sample, and to deliver the charged particles to a charged particle analyzer provided at a subsequent stage through a charged particle introduction opening, the device comprising:

a) a probe that is formed integral with the column;

b) a voltage source configured to apply a predetermined charged-particle obtaining voltage to the probe;

c) an interfering gas supply line configured to hinder the eluate nebulized by the probe from moving toward the charged particle introduction opening, where the interfering gas supply line is configured to blow an interfering gas in a direction intersecting an axis of the charged particles entering into the charged particle introduction opening, the interfering gas being blown from a position different from a position of the charged particle introduction opening; and d) a processor configured to implement an analysis control unit configured to control the voltage source such that, while the eluate is being introduced into the probe, regardless of whether a target-component is introduced into the probe, the charged-particle obtaining voltage is applied, and to control the interfering gas supply line to blow the interfering gas such that, only in a time period other than a time period in which the target-component is introduced into the probe, the eluate is hindered from moving toward the charged particle introduction opening.

5. The charged-particle supply control device according to claim 4, further comprising e) a gasification promoting gas supply line configured to supply a gasification promoting gas for promoting gasification of the eluate flowing out of the probe, wherein the analysis control unit is further configured to control the gasification promoting gas supply line such that, while the eluate is being introduced into the probe, the gasification promoting gas is supplied.

* * * * *